(12) United States Patent
Lee et al.

(10) Patent No.: US 11,431,163 B2
(45) Date of Patent: Aug. 30, 2022

(54) DEVICE, SYSTEM AND METHOD FOR THROTTLING CURRENT TO PERIPHERALS

(71) Applicant: MOTOROLA SOLUTIONS, INC., Chicago, IL (US)

(72) Inventors: Wai Mun Lee, Bayan Lepas (MY); Tzun Chuan Woo, Bayan Lepas (MY); Peter J. Bartels, Chicago, IL (US); Yehuda Rokach, Airport City (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 120 days.

(21) Appl. No.: 17/131,979

(22) Filed: Dec. 23, 2020

(65) Prior Publication Data

US 2022/0200271 A1 Jun. 23, 2022

(51) Int. Cl.
*H02H 9/02* (2006.01)
*H04B 1/40* (2015.01)
*H02H 1/00* (2006.01)

(52) U.S. Cl.
CPC ............ *H02H 9/02* (2013.01); *H02H 1/0007* (2013.01); *H04B 1/40* (2013.01)

(58) Field of Classification Search
CPC ........ H04W 52/0274; H04W 52/0277; H04W 52/028; G06F 1/26; G06F 1/3206; G06F 1/3212; G06F 1/3234; G06F 1/325; G06F 1/3287; H02H 9/02; H02H 1/0007; H04B 1/40

See application file for complete search history.

(56) References Cited

U.S. PATENT DOCUMENTS

| 6,304,978 | B1 * | 10/2001 | Horigan ................... G06F 1/26 713/340 |
| 7,076,234 | B2 | 7/2006 | Grivas et al. |
| 8,060,152 | B2 | 11/2011 | Lee et al. |

(Continued)

FOREIGN PATENT DOCUMENTS

WO WO-2020231514 A1 * 11/2020 ............. G06F 1/324

OTHER PUBLICATIONS

PCT/US2021/062142, Device, System and Method for Throttling Current to Peripherals, Dec. 7, 2021.

*Primary Examiner* — Jared Fureman
*Assistant Examiner* — Nicolas Bellido
(74) *Attorney, Agent, or Firm* — Perry + Currier, Inc.

(57) ABSTRACT

A device, method and system for throttling current and/or power to peripherals is provided. A device comprises peripherals powered by a power source. The device further comprises a throttling circuit configured to: in response to receiving a given interrupt, cause throttling of respective currents to a given subset of the peripherals. The device further comprises a sensing circuit configured to: in response to determining that a sensed current from the power source exceeds a threshold current, provide the given interrupt to the throttling circuit. The device further comprises a primary processor configured to: determine the threshold current based at least on a predetermined maximum current of a presently prioritized peripheral; and provide the threshold current to the sensing circuit. The device further comprises a secondary processor configured to: determine the given subset of the peripherals based on an available current overhead.

20 Claims, 8 Drawing Sheets

(56) References Cited

U.S. PATENT DOCUMENTS

| | | |
|---|---|---|
| 10,255,231 B1* | 4/2019 | Briggs ................ G06F 1/3243 |
| 10,285,081 B1 | 5/2019 | Bartels |
| 2004/0116161 A1* | 6/2004 | Grivas ................ H04W 52/027 |
| | | 455/574 |
| 2008/0178032 A1 | 7/2008 | Walrath |
| 2009/0005126 A1 | 1/2009 | Wang et al. |
| 2009/0252054 A1 | 10/2009 | Barkan et al. |
| 2012/0254633 A1 | 10/2012 | Vilhauer et al. |
| 2016/0349829 A1 | 12/2016 | Spiel et al. |

* cited by examiner

US 11,431,163 B2

DEVICE, SYSTEM AND METHOD FOR THROTTLING CURRENT TO PERIPHERALS

BACKGROUND OF THE INVENTION

Batteries, and/or other power sources, of intrinsically safe devices, such as mobile devices, and the like, may include a safety circuit which is tripped when power and/or current drawn from the battery reaches a threshold value.

BRIEF DESCRIPTION OF THE SEVERAL VIEWS OF THE DRAWINGS

The accompanying figures, where like reference numerals refer to identical or functionally similar components throughout the separate views, together with the detailed description below, are incorporated in and form part of the specification, and serve to further illustrate embodiments of concepts that include the claimed invention, and explain various principles and advantages of those embodiments.

Figure 1:
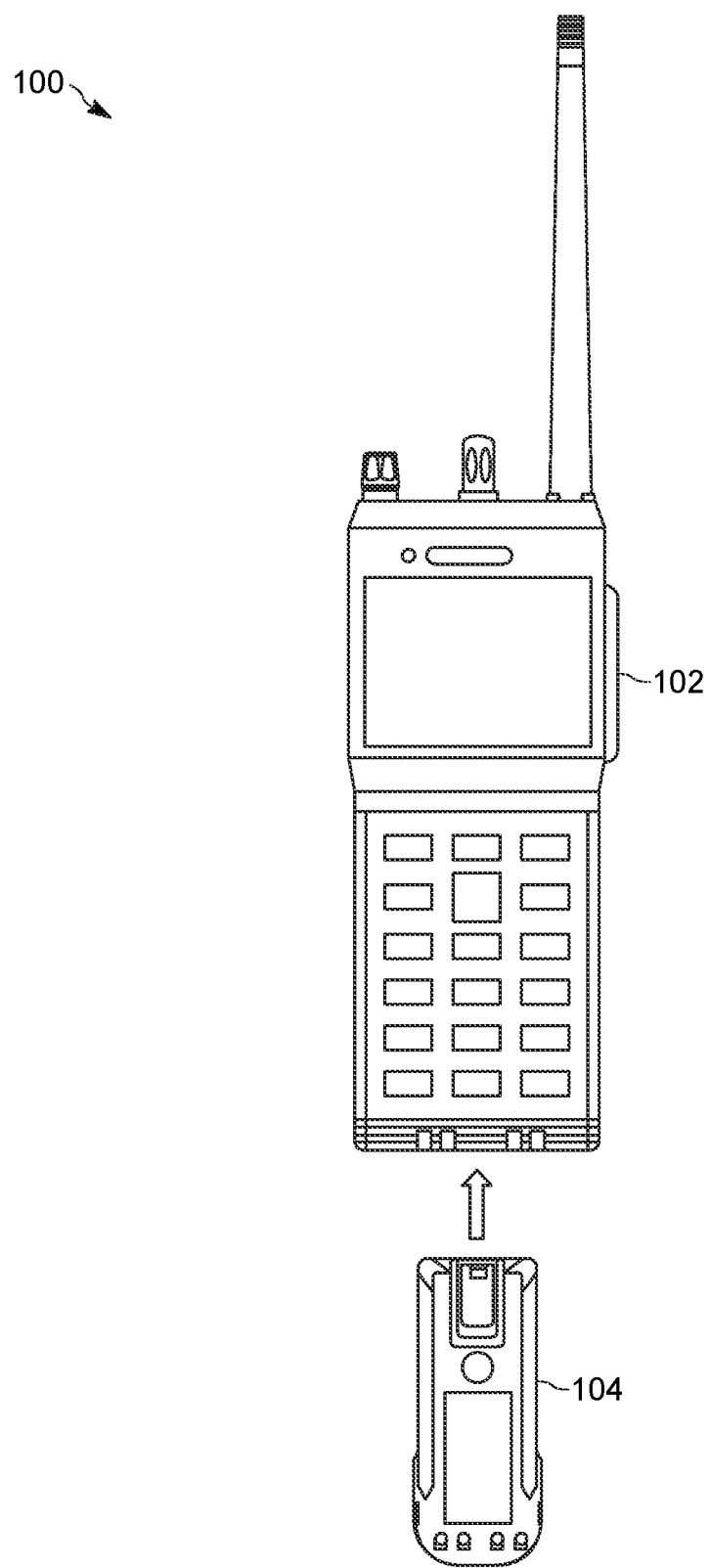
FIG. 1 depicts a system that includes device for throttling current and/or power to peripherals thereof, from a power source in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Batteries, and/or other power sources, of intrinsically safe devices, such as mobile devices, and the like, may include a safety circuit which is tripped when a current and/or power drawn from the battery and/or power source reaches a threshold value. Such devices include various peripherals which draw current and/or power from a power source thereof. Such peripherals may include, but are not limited to, various transceivers, such as cell phone and/or broadband transceivers (e.g. Long Term Evolution (LTE) transceivers, and the like), narrowband transceivers, WiFi transceivers, and the like. Other peripherals may include a camera, a flash for the camera, which may be used as a flashlight, and the like. A particular peripheral may, for a time period, be a most active and/or prioritized peripheral which may lead to a high draw of current and/or power from the power source for the time period. As such, when another peripheral draws current and/or current from the power source, the total current and/or power drawn from the power source, for example in combination with transient currents, and the like, at the device, may cause power and/or current drawn from the battery and/or power source to reach the threshold value, causing the safety circuit to trip and/or reset. Complicating the situation, safety circuits may react within a very small amount of time, such on the order of 5 µs. Hence, software based solutions alone may be challenging to implement as they may not respond fast enough (e.g. within 5 µs) to prevent tripping of such safety circuits. Alternatively, current drawn from the battery and/or power source may cause a voltage slump at the battery and/or power source. Thus, there exists a need for an improved technical device, system and method for throttling current and/or power to peripherals.

As such, provided herein is a device that throttles current and/or power to peripherals. The device includes a throttling circuit configured to: in response to receiving a given interrupt (described below), cause throttling of respective currents to a given subset of the peripherals, for example when another prioritized peripheral is drawing power and/or current from a power source of the device that may include a safety circuit. In particular, the device further includes a sensing circuit configured to: in response to determining that a sensed current from the power source exceeds a threshold current, provide the given interrupt to the throttling circuit. Both the throttling circuit and the sensing circuit may comprise ultra-fast electronic switching components which typically respond in less than 5 µs (e.g. faster than the safety circuit). As such, when one particular peripheral is a presently prioritized peripheral, power and/or current may be throttled to one or more of the other peripherals via an interrupt provided to the throttling circuit by the sensing circuit to prevent the one or more other peripherals from drawing sufficient power and/or current to trip the safety circuit.

The threshold current may be based on predetermined maximum current of a presently prioritized peripheral (e.g. for example minus a given factor such as 10% and the like). Selection of which peripherals to throttle may be based on an available current overhead, which may be a difference between the threshold current and a given maximum current. The given maximum current may comprise a smaller of a safety-related maximum current that trips the safety circuit of the power source; and a voltage slump-related maximum current that causes a voltage slump at terminals of the power source. The voltage slump-related maximum current may change as inductance at the power source varies over time due to changes in which peripherals, and/or other components of the device, are drawing power at any given time. Hence, the voltage slump-related maximum current may be determined periodically based on sensed current by the sensing circuit. The selection of which peripherals to throttle may occur by selecting peripherals which have predetermined maximum currents which sum to a value that is less than the available current overhead, and the remaining peripherals are selected as a given subset of the peripherals for which current is throttled.

An aspect of the present specification provides a device comprising: peripherals powered by a power source; a throttling circuit configured to: in response to receiving a given interrupt, cause throttling of respective currents to a given subset of the peripherals; a sensing circuit configured to: in response to determining that a sensed current from the power source exceeds a threshold current, provide the given interrupt to the throttling circuit via a hardware data line therebetween; a primary processor configured to: determine the threshold current based at least on a predetermined maximum current of a presently prioritized peripheral; and provide the threshold current to the sensing circuit; and a secondary processor configured to: determine the given subset of the peripherals based on an available current overhead.

Another aspect of the present specification provides a method comprising: determining, at one or more processors of a device, a presently prioritized peripheral of the device; determining, at the one or more processors, a threshold current of the device; providing, via the one or more processors, the threshold current to a sensing circuit of the device, the sensing circuit configured to sense when a sensed current of a power source of the device exceeds the threshold current; determining, at the one or more processors, an available current overhead of the device; determining, at the one or more processors, based on the available current overhead, a given subset of peripherals of the device to current throttle when the sensed current exceeds the threshold current; providing, at the one or more processors, an indication of the given subset of peripherals to a throttling circuit; in response to the sensing circuit sensing that the sensed current of the power source exceeds the threshold current, providing a given interrupt from the sensing circuit to the throttling circuit, via a hardware data line therebetween; and in response to the throttling circuit receiving the given interrupt on the hardware data line, causing throttling, via the throttling circuit, based on the indication of the given subset, throttling of current at the given subset of the peripherals.

Each of the above-mentioned examples will be discussed in more detail below, starting with example system and device architectures of the system in which the embodiments may be practiced, followed by an illustration of processing blocks for achieving an improved technical method, device, and system for throttling current and/or power to peripherals.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions unless otherwise indicated. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts a perspective view of an example system 100 that includes a device 102 for throttling current and/or power to peripherals thereof for example from a power source 104. While as depicted the power source 104 and the device 102 are separate from one another, the power source 104 and the device 102 are generally configured to mate such that the power source 104 powers the device 102. However, the device 102 may be provided and/or sold separate from the power source 104.

As depicted, the device 102 may comprise a hazardous location (HAZLOC) mobile device, and the power source 104 may comprise a HAZLOC battery, each for use in mines and/or other hazardous locations where sparks and the like may cause explosions and the like. As such, the power source 104 may include a safety circuit (described below) which causes voltage and/or power and/or current to be reduced at terminals of the power source 104 when a safety-related maximum current, and the like, is reached at the power source 104, for example to prevent sparking, and the like, at the terminals However, in other examples, the device 102 and/or the power source 104 may be adapted for use in non-hazardous locations, and/or may not include a safety circuit and/or the device 102 may not be a mobile device and/or the power source 104 may be a power source other than a battery. Furthermore, while as depicted the power source 104 is removable from the device 102, in other examples, the power source 104 may not be removable from the device 102.

In general, however, the device 102 is configured to throttle current and/or power to peripherals thereof, for example to prevent tripping the safety circuit and/or more generally to prevent voltage slumps at terminals of the power source 104. Hereafter, reference will be made to throttling current, though it is understood that such throttling leads to concurrent throttling of power.

Figure 2:
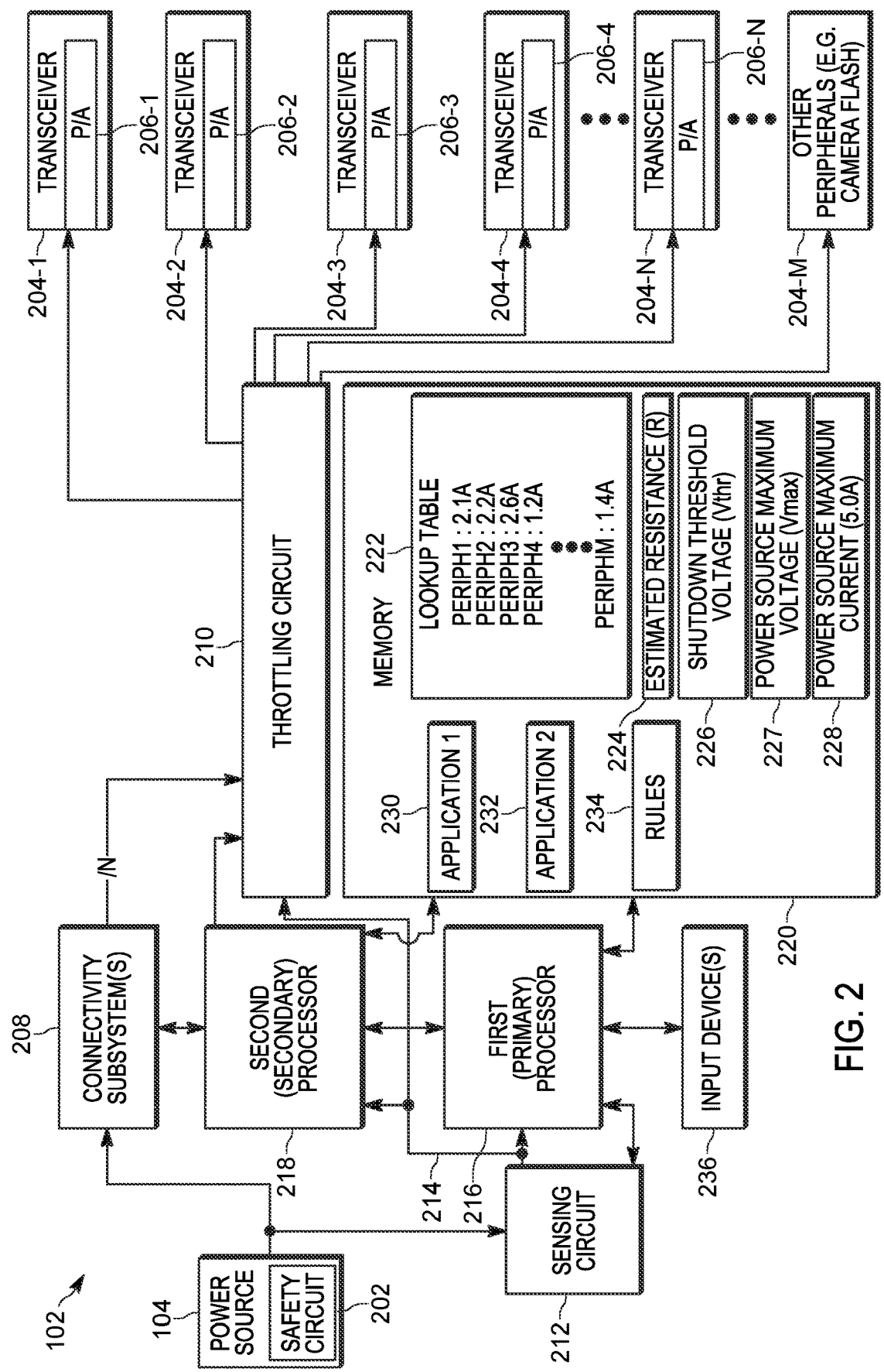
FIG. 2 is a device diagram showing an example structure of the device of FIG. 1, in accordance with some examples.

Attention is next directed to FIG. 2 which depicts a schematic block diagram of components of the device 102, including the power source 104 provided therein with a safety circuit 202 at the power source 104. As mentioned above, the safety circuit 202, which may be optional, may "trip" and/or reset when a given safety-related maximum current occurs at the power source 104 leading to at least a temporary reduction in power to the components of the device 102. In some examples, the given safety-related maximum current may be a current that causes a voltage at terminals of the power source 104 at which sparking occurs. Such a voltage may be predetermined and stored at a memory of the device 102, described in more detail below As will become apparent, in FIG. 2, some components are described as being connected via power lines to the power source 104 and/or each other, while other components are described as being connected via data lines therebetween and, more specifically, hardware data lines therebetween. Regardless, if a component is not described as having a power line connected thereto, it is nonetheless understood that the power source 104 generally powers such components (e.g. regardless of whether a power line is depicted or not depicted).

As depicted, the device 102 comprises various peripherals 204-1, 204-2, 204-3, 204-4 ... 204-N ... 204-M (e.g. an "N" number of peripherals of a given type of peripheral, which may be transceivers, as described hereafter, with a total "M" number of peripherals). The peripherals 204-1, 204-2, 204-3, 204-4 ... 204-N ... 204-M are interchangeably referred to hereafter, collectively, as the peripherals 204 and, generically, as a peripheral 204. This convention will be used elsewhere in the present specification.

As depicted, the peripherals 204-1, 204-2, 204-3, 204-4 ... 204-N comprise "N" number of transceivers and/or radios and/or modems, which may comprise any include, but is not limited to, any suitable combination of a cell phone transceiver, a digital mobile radio (DMR) transceiver, Project 25 (P25) transceiver, a terrestrial trunked radio (TETRA) transceiver, a $3^{rd}$ Generation Partnership Project (3GPP) transceiver, a Long-Term Evolution (LTE) transceiver, a Global System for Mobile communications (GSM) transceiver, a 5G transceiver, a 5G transceiver (e.g., a transceiver for use with network architecture compliant with, for example, the 3GPP Technical Specification (TS) 23 specification series and/or a new radio (NR) air interface compliant with the 3GPP TS 38 specification series) a Bluetooth transceiver, a Wi-Fi transceiver (e.g., operating in accordance with an IEEE 802.11 standard (e.g., 802.11a, 802.11b, 802.11g), a Worldwide Interoperability for Microwave Access (WiMAX) transceiver, and/or another similar type of wireless transceiver configurable to communicate via a wireless radio network As depicted, a peripheral 204-1, 204-2, 204-3, 204-4 ... 204-N (e.g. transceivers) comprises a respective power amplifier 206-1, 206-2, 206-3, 206-4 ... 206-N (e.g. power amplifiers 206 and/or a power amplifier 206, indicated as "P/A" in FIG. 2) which amplify power from the power source to power the peripherals 204-1, 204-2, 204-3, 204-4 ... 204-N (e.g. transceivers). Hence, in general, the power source 104 powers the power amplifiers 206, as described in more detail below. Furthermore, it is understood that the peripherals 204-1, 204-2, 204-3, 204-4 ... 204-N (e.g. transceivers) may operate in a transmit mode or a receive mode, for example to respectively transmit or receive signals and/or data.

As depicted, the device 102 further comprises at least one connectivity subsystem 208 which may include other hardware for the transceivers of the peripherals 204-1 ... 204-N including, but not limited to, wireless input/output (I/O) interfaces, modulators/demodulators and the like. As depicted, there is a power line from the power source 104 to the at least one connectivity subsystem 208 which may distribute and/or otherwise control power to the power amplifiers 206, for example via a throttling circuit 210. Put another way, while the transceivers of the peripherals 204-1, 204-2, 204-3, 204-4 ... 204-N and the power amplifiers 206 are depicted as separate from at least one connectivity subsystem 208, the transceivers of the peripherals 204-1, 204-2, 204-3, 204-4 ... 204-N may be components of the at least one connectivity subsystem 208 which, for example, may control a respective transceiver between a transmit mode or a receive mode, and the like.

Hence, while one connectivity subsystem 208 is depicted, the connectivity subsystem 208 may include any suitable number of connectivity subsystems 208, for example one connectivity subsystem 208 per transceiver type, to control wireless communications at the device 102. In a particular example the device 102 may include a transceiver, and associated input devices, used to push-to-talk (PTT) wireless communications. When a PTT input device is actuated (e.g. a PTT button), an associated PTT connectivity subsystem 208 may control a respective transceiver into a transmit mode, with an associated power amplifier 206 controlled by the associated PTT connectivity subsystem 208 to provide sufficient power to transmit in the transmit mode; otherwise, when the PTT input device is unactuated, the associated PTT connectivity subsystem 208 may control the respective transceiver into a receive mode, with the associated power amplifier 206 controlled by the associated PTT connectivity subsystem 208 to provide sufficient power to receive in the receive mode, which may be a different amount of power than in the transmit mode. In yet further examples, the associated PTT connectivity subsystem 208 may control the respective transceiver into a standby mode in which wireless metadata is received to schedule PTT transmit and receive time slots, and the like, with the associated power amplifier 206 controlled by the associated PTT connectivity subsystem 208 to provide sufficient power to receive such wireless metadata in the standby mode.

However, a transceiver and/or an associated power amplifier 206 may be controlled in different ways and/or into other modes, which may depend on a type of data being transmitted or received. For example, video data being transmitted or received may use more power than audio data, among other possibilities, with an associated power amplifier 206 controlled accordingly.

Hence, to control the power amplifiers 206, the least one connectivity subsystem 208 is depicted has including an "N" (e.g. "/N") number of connections to the power amplifiers 206, via a throttling circuit 210 described below) over which power to the power amplifiers 206 may be provided. In some examples, power provided to the power amplifiers 206 may depend on a mode in which a respective transceiver is to be used.

As depicted, other peripherals 204 (e.g. the peripherals labelled as "204-M" and which will hence be referred to hereafter as the peripherals 204-M) may comprise peripherals other than transceivers for example, as depicted, a camera, a camera flash, a flashlight among other possibilities. Hence, the device 102 is understood to include any suitable number of peripherals 204 of any suitable types; in particular, a peripheral 204 may be understood to include any type of device and/or auxiliary device that may be provided at the device 102 to provide and/or expand functionality thereof While the other peripherals 204-M are depicted without power amplifiers 206, such peripherals 204-M may include power amplifiers.

Furthermore, while connectivity (e.g. communication functionality) of the device 102 is described with respect to wireless communications, in some examples, the device 102 may include functionality for wired communication and/or may include only components for wired communication and/or may not be configured for communication. In these last examples, the device 102 may include the peripherals 204-M, and not the peripherals 204-1 . . . 204-N.

As depicted, the device 102 further comprises the throttling circuit 210 configured to: in response to receiving a given interrupt (described below), cause throttling of respective currents to a given subset of the peripherals 204. For example, as depicted, there are respective hardware connections between the throttling circuit 210 and the peripherals 204 which may be used to turn off respective power, from the at least one connectivity subsystem 208, to the peripherals 204 based on interrupts.

In particular, the throttling circuit 210 may comprise switches, such as ultra-fast switches, and the like, which may switch a respective hardware power connection, between the at least one connectivity subsystem 208 and a respective power amplifier 206, on or off, to throttle current usage, and the like, at a respective power amplifier 206. Put another way, the throttling circuit 210 may comprises respective hardware switches to cause throttling of the respective currents to the given subset of the peripherals 204 as described below (e.g. a hardware switch per data line to the peripherals 204) and such hardware switches may comprise ultra-fast switches, and the like.

However, the throttling circuit 210 may further comprise switches (e.g. ultra-fast switches) to turn power to the other types of peripheral 204-M on or off and/or otherwise cause throttling of respective currents to the other types of peripherals 204-M.

While present examples are described with respect to power to a peripheral 204 being turned on or off, to throttle current used by a peripheral, in other examples the hardware switches of the throttling circuit 210 may limit power and/or current to a peripheral 204 to a non-zero, but non-maximum value. For example, the hardware switches of the throttling circuit 210 may reduce power and/or current to a peripheral 204 by 10%, 50%, 80%, among other possibilities. In yet further examples, the throttling circuit 210 may be configured to throttle current to a peripheral 204 may transmitting a data command to a peripheral 204 to cause the peripheral 204 to throttle current thereto; in these examples the connections between the connectivity subsystem and the throttling circuit 210, as well as the connections between the throttling circuit 210 and the peripherals, may comprise data lines, with power being provided to the peripherals 204 via other power connections to the power source 104.

In the depicted example, at least a portion of the peripherals 204 (e.g. four peripherals 204) comprise transceivers, with the at least one connectivity subsystem 208 including hardware for the transceivers (e.g. and which may include the power amplifiers 206). In these examples, the throttling circuit 210 be configured to cause throttling of respective currents to a given subset of the peripherals 204 by causing throttling the respective currents to the power amplifiers 206.

The interrupts used to control the throttling circuit 210, along with which peripherals 204 to throttle, are described below, however, different interrupts may be provided to the throttling circuit 210 to cause the throttling circuit 210 to throttle different subset of the peripherals 204 which may depend, for example, on a mode in which a peripheral 204 is currently being used (e.g. a transmit mode or a receive mode). Such different interrupts are also described below.

As depicted, the device 102 further comprises a sensing circuit 212 configured to: in response to determining that a sensed current from the power source 104 exceeds a threshold current, provide a given interrupt to the throttling circuit 212, for example via the depicted hardware data line 214 therebetween, which may be dedicated to the sensing circuit 212 transmitting interrupts to the throttling circuit 212. As such, the sensing circuit 212 may comprise any suitable comparator circuit, and/or comparator circuits, for comparing sensed current to a threshold current.

As depicted, the sensing circuit 212 is tapped into a power line from the power source 104, and the sensing circuit 212 is understood to include any suitable combination of hardware components for sensing current on the power line from the power source 104. In particular, the sensing circuit 212 may be connected "close" to the terminals of the power source 104 and be configured to sense current from the power source 104 and/or changes to current being drawn from the power source (e.g. by the peripherals 204) as quickly as possible.

In general, the circuits 210, 212 may include ultra-fast electronic switching components that may provide functionality as described herein within 5 µs, and the like. Such ultra-fast electronic switching components may include commercial off-the-shelf components, but assembled in a manner that provides the functionality as described herein. Such ultra-fast electronic switching components may, for example include, but is not limited to, pico-switches, silicon carbide (SiC) MOSFETs (e.g. metal oxide silicon field effect transistors and/or metal oxide semiconductor field effect transistors); however, any suitable ultra-fast electronic switching components are within the scope of the present specification.

As depicted, the device 102 further comprises a first processor 216 (interchangeably referred to hereafter as a primary processor 216) and a second processor 218 (interchangeably referred to hereafter as a secondary processor 218).

In general, the processors 216, 218 may include one or more logic circuits, one or more processors, one or more microprocessors, and/or the processors 216, 218 may include one or more ASIC (application-specific integrated circuits) and one or more FPGA (field-programmable gate arrays), and/or another electronic device which provide the functionality described herein. While the device 102 is described with respect to two processors 216, 218, in other examples, the processors 216, 218 may be replaced with one (e.g. primary) processor and/or more than two processors.

In particular, the primary processor 216 may comprise a processor for the device 102 which implements general functionality therefor, such as an operating system, and the like, as well as the functionality described herein, as well as operating the peripherals 204-M that are not transceivers.

In contrast, the secondary processor 218 may comprise a processor that implements general functionality associated with the at least one connectivity subsystem 208 and the peripherals 204-N that are transceivers and/or which may be at least partially dedicated to implementing functionality on behalf of the least one connectivity subsystem 208, as well as the functionality described herein. However, input for operating the transceivers may be received via the primary processor 216 (e.g. via input devices 236 described below) and the processors 216, 218 may hence communicate to implement connectivity functionality of the device 102 with the secondary processor 218 performing connectivity processing functionality on behalf of the primary processor 216; hence, the second processor 218 may be "secondary" to the first processor 216.

As depicted, the processors 216, 218 are in communication with the sensing circuit 212 for example on the hardware data line 214 between the circuits 210, 212 which may be dedicated to the sensing circuit 212 transmitting interrupts to the throttling circuits. As such, when the sensing circuit 212 transmits an interrupt to the throttling circuit 210, the processors 216, 218 may also receive such an interrupt, for example to be notified that the throttling circuit 210 is causing (and/or is about to cause) throttling of respective currents to a given subset of the peripherals 204.

However, as depicted, the primary processor 216 is in communication with the sensing circuit 212 and the secondary processor 218 via respective data lines (e.g. depicted as double-ended arrows therebetween), which may comprise data lines of a common data and address bus, and the like, of the device 102. Such a common data and address bus may be used to exchange data between components of the device 102. The hardware data line 214 may be separate from a common data and address bus of the device 102.

Furthermore, as depicted, there are data lines (e.g. also depicted as double-ended arrows therebetween) between the secondary processor 218 and the at least one connectivity subsystem 208, and the secondary processor 218 and the throttling circuit 210, which may also comprise data lines of the common data and address bus, and the like, of the device 102.

The primary processor 216 may be generally configured to determine a threshold current (e.g. at which the sensing circuit 212 provides a given interrupt) based at least on a predetermined maximum current of a presently prioritized peripheral 204; and provide the threshold current to the sensing circuit 212 (e.g. on a data line therebetween). A presently prioritized peripheral 204 and a predetermined maximum current is described in more detail below however, in general, the threshold current may comprise one or more of: the predetermined maximum current of the presently prioritized peripheral 204; and the predetermined maximum current of the presently prioritized peripheral adjusted by a given amount; for example, the predetermined maximum current of the presently prioritized peripheral 204 may be reduced by 5%, 10%, 15%, among other possibilities.

The secondary processor 218 may be generally configured to determine the given subset of the peripherals 204 (e.g. for which respective currents are caused to throttle by the throttling circuit 210) based on an available current overhead which may be determined by the primary processor 216 and provided to the secondary processor 218 on a data line therebetween.

As will be described in more detail below, a given maximum current of the power source 104 may be determined by the primary processor 216, and the given maximum current may comprise: a smaller of a safety-related maximum current that trips the safety circuit 202; and a voltage slump-related maximum current that causes a voltage slump at terminals of the power source 104.

As will be further described below, the available current overhead may comprises a difference between the threshold current and the given maximum current, and the secondary processor 217 may be further configured to determine the given subset of the peripherals 204 (e.g. for which throttling of current is to occur by the throttling circuit 210) based on the available current overhead and respective predetermined maximum currents used by the peripherals, other than the presently prioritized peripheral. Furthermore, the secondary processor 218 may provide an indication, and the like, of the given subset of the peripherals 204, to which current is to be throttled, to the throttling circuit 210, which responds accordingly when an interrupt is received from the sensing circuit 212.

As depicted, the device 102 further comprises a memory 220 which stores a lookup table 222, and the like, storing respective maximum currents of the peripherals 204. For example, as depicted a first peripheral (e.g. "Periph1" such as the peripheral 204-1) may have a maximum current of 2.1 Amps, a second peripheral (e.g. "Periph2" such as the peripheral 204-2) may have a maximum current of 2.2 A, etc. As depicted, the lookup table stores a respective maximum current for each peripheral 204 for which the throttling circuit 210 may cause throttling of current thereto. Such maximum currents may be provisioned at the memory 220 at a factory and the like. Furthermore, such maximum currents may be stored in any suitable format other than a lookup table. Hence, generally, the device 102 is understood to comprise the memory 220 storing respective predetermined maximum currents used by the peripherals 204, including a predetermined maximum current of a presently prioritized peripheral 204. In other words, one of the peripherals 204, for which the memory 220 stores predetermined maximum currents, may be selected as a presently prioritized peripheral 204, described in more detail below. In particular, the predetermined maximum currents stored at the memory 220 may comprise maximum root mean square (RMS) currents of the peripherals 204, but may comprise the predetermined maximum currents in any suitable format.

As depicted, the memory 220 further stores parameters associated with the device 102 and/or the power source 104 which may be measured at the device 102 (e.g. via the sensing circuit 212) and/or read from the power source 104 (e.g. by the processor 216, and the like, presuming there is a data line between the processor 216 and the power source 104) and/or provisioned at the memory 220 (e.g. at a factory, and the like). Such parameters may include, but are not limited to: an estimated resistance 224 (e.g. a measured inductance) of the power source 104, which is measured periodically, as described below: a shutdown threshold voltage 226, which may be provisioned at the memory 220; a maximum voltage 227 that may be read from the power source 104 (e.g. from a memory thereof, not depicted); and a maximum current 228 of the power source 104, which may also be read from the power source 104. The maximum current 228 may comprise a safety-related maximum current at which the safety circuit 202 trips, and the like.

In general, the estimated resistance 224 may be determined by the primary processor 216 controlling the device 102 into an idle mode in which current from drawn from the power source 104 is primarily transient currents, which is measured by the sensing circuit 212 (e.g. the sensing circuit 212 may measure RMS currents at the terminals of the power source 104). Using Kirchoff's Law (e.g. V=IR, where "V" is voltage, "I" is current" and "R" is resistance) the resistance 224 may be estimated from the known power source maximum voltage 227 and the measured current. In general, the estimated resistance 224 represents a resistance and/or inductance estimated at the terminals of the power source 104 due to active peripherals 204 and/or other components, connected to the power source 104 at any given time though, in the idle mode, such active peripherals 204 may be controlled into a state where minimum power is drawn from the power source 104. As will be explained in more detail below, once the resistance 224 is estimated (e.g. which may change over time), a voltage slump-related maximum current may be estimated using the shutdown threshold voltage 226 and Kirchoff's Law. In particular, the shutdown threshold voltage 226 may be a value that has been predetermined and stored at the memory 220 at a factory and/or in a provisioning mode of the device 102.

Furthermore, the estimated resistance 224 may be determined periodically, for example every few minutes, and the like, and/or during periods of minimal activity at the device 102 and/or at the peripherals 204 (e.g. when the transceivers of the peripherals 204 are "connected" to a respective network, but not transmitting or receiving data other than metadata, which may also be the conditions into which such transceivers are controlled in an idle mode).

Alternatively, or in addition, the sensing circuit 212 may be configured to measure one or more of resistance and voltage at the terminals of the power source 104 in addition to, or alternatively to, current, with associated currents (e.g. such as a voltage slump-related maximum current) determined from measured resistance and voltage using Kirchoff's Law.

Regardless, it is hence understood that the sensing circuit 212 may include an analog-to-digital converter (ADC) configured to convert measured currents (e.g. and/or resistance and/or voltage) to digital indications of same, which may be provided to the primary processor 216 via a data line to implement functionality as described herein. The sensing circuit 212 may include a digital-to-analog converter (DAC) configured to convert received digital values (e.g. such as a threshold current received from the primary processor 216 via a data line) to analog indications of same, which may be used by comparators of the sensing circuit 212 to determine when a sensed current exceeds the received threshold current.

As depicted, the memory 220 is understood to include any suitable non-transitory machine readable medium that stores machine readable instructions to implement one or more programs or applications such as the applications 230, 232. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functional teachings of the device 102 as described herein are maintained, persistently, at the memory 220 and used by the processors 216, 218, which make appropriate utilization of volatile storage during the execution of such programming instructions.

For example, the memory 220 may further store a first application 230 which may comprise instructions which, when implemented by the primary processor 216, causes the primary processor 216 to: determine the threshold current based at least on a predetermined maximum current of a presently prioritized peripheral 204; and provide the threshold current to the sensing circuit 210, described in more detail herein.

Similarly, as depicted, the memory 220 may further store a second application 232 which may comprise instructions which, when implemented by the secondary processor 218, causes the secondary processor 218 to: determine the given subset of the peripherals 204 based on an available current overhead, described in more detail herein.

In some examples, the memory 220 further stores rules 234 which may be used by the secondary processor 218, in conjunction with the second application 232, to determine the given subset of the peripherals 204. In particular, the rules 234 may be user-configured and/or preconfigured, and indicate which peripherals 204 are to be preferentially current throttled when another peripheral 204 is a presently prioritized peripheral 204. However, the rules 234 may further indicate which of the peripherals 204 may be selected as a presently prioritized peripheral 204, for example when more than one of the peripherals 204 is presently active, and the like.

The term "presently prioritized peripheral" as used herein may include a peripheral 204 that is presently most active, such as a transceiver transmitting or receiving the most data and/or using the most power, which may be determined by the secondary processor 218 monitoring activity at the at least one connectivity subsystem 208. However, a peripheral 204 that is presently most active may include any of the peripherals 204 that are currently being operated to perform an associated function and/or using the most power.

However, term "presently prioritized peripheral" as used herein may additionally, and/or alternatively, include a peripheral 204 selected on the basis of other conditions which may include, but is not limited to input from one or more input devices 236 at the device 102. For example, such input devices 236 may include, but are not limited to the aforementioned PTT button and/or any other combination of touch screens, buttons (e.g. which may be physical or electronic as provided at a touch screen), knobs, and the like. User input from such input devices 236 may be used to select a given peripheral 204 to perform an associated function at the device 102; such a given peripheral 204 may hence be selected as the presently prioritized peripheral 204.

However, in some examples, a selected peripheral 204 (e.g. as selected via user input) may consume less power and/or be less presently active than another peripheral; in such examples, the rules 234 may be used to resolve such conflicts as to which peripheral 204 to select as a presently prioritized peripheral 204. For example, a camera being currently operated may use less power and/or be less active than a transceiver, as a transceiver may "constantly" be transmitting or receiving metadata while the camera may only receive input intermittently; however, in this example, as the camera is presently being used (e.g. an associated application thereof is being processed by the primary processor 216), and as the transceiver is only transmitting or receiving metadata, the camera may be selected as the presently prioritized peripheral 204. In other examples, an LTE and/or 5G transceiver may be presently being used to transmit or receive video while a WiFi transceiver is operational but being used to browse via an associated browser application processed by the primary processor 216; in such examples, the peripheral 204 that includes the LTE and/or 5G transceiver may be selected as the presently prioritized peripheral 204 by virtue of transmitting or receiving video. However, the rules 234 may be configured in any particular manner to select the presently prioritized peripheral 204, and which may be user configured and/or provisioned at the memory 220, for example at a factory and/or installed by an entity managing the device 102.

In some examples, the primary processor 216 may determine which of the peripherals 204 is presently prioritized, at least based on activity of the at least one connectivity subsystem 208, determined by the processors 216, 218 communicating, and the like. Put another way, the at least one connectivity subsystem 208 may be in communication with the secondary processor 218 and the primary processor 216 via one or more data lines (e.g. as depicted the primary processor 216 may be in communication with at least one connectivity subsystem 208 via the secondary processor 218), and the primary processor 216 may be further configured to determine which of the peripherals 204 is the presently prioritized peripheral 204 by communicating with the at least one connectivity subsystem 208 over one or more of the data lines and the secondary processor 218. Indeed, the primary processor 216 may receive any suitable data from the secondary processor 218 and/or the at least one communication subsystem 208 to determine activity, and the like, at the transceivers of the peripherals 204-N, and may further monitor activity of the other peripherals 204-M and select a presently prioritized peripheral 204 accordingly.

Hence, the primary processor 216 is understood to determine a presently prioritized peripheral 204 and further determine a predetermined maximum current of the presently prioritized peripheral 204 by retrieving the predetermined maximum current of the presently prioritized peripheral 204 from the lookup table 222, and the like. For example, the primary processor 216 may determine that the transceiver of the peripheral 204-1 is the presently prioritized peripheral 204 and retrieve the value "2.1 A" from the lookup table 222.

The primary processor 216 is generally configured to determine a threshold current using, for example, the predetermined maximum current of the presently prioritized peripheral 204 as retrieved from the memory 220. In some examples, the threshold current may be set to the predetermined maximum current of the presently prioritized peripheral 204. In other examples, the threshold current may be set to the predetermined maximum current of the presently prioritized peripheral adjusted by a given amount, such as reduced by 5%, 10%, 15% among other possibilities. In general, the threshold current is selected as a value of current at which throttling of current is to occur for a given subset of the peripherals 204 to prevent the peripherals 204 from drawing a current that might exceed a given maximum current (e.g. in the event that the given subset of the peripherals 204 draw their respective maximum currents). In some examples, the threshold current may comprise the predetermined maximum current of the presently prioritized peripheral 204 (e.g. adjusted or not adjusted) with predetermined transient currents of the device 102 added thereto (e.g. transient currents of the device 102 measured in an idle mode); hence the threshold current may comprise the predetermined maximum current of the presently prioritized peripheral 204 adjusted based on such transient currents.

Furthermore, the threshold current may be determined periodically by the primary processor 216 and/or for example as a presently prioritized peripheral 204 changes (e.g. as different peripherals 204 become more active or less active relative to other peripherals 204). As the threshold current changes, the primary processor 216 may provide the threshold current to the sensing circuit 212.

In some examples, the given maximum current may comprise the maximum current 228 of the power source 104 retrieved from the memory 220.

Alternatively, the given maximum current may comprise a voltage slump-related maximum current that causes a voltage slump at terminals of the power source. For example, the primary processor 216 may use the periodically determined estimated resistance 224, the predetermined shutdown threshold voltage 226 and Kirchoff's law, to determine such a voltage slump-related maximum current which may be less than the maximum current 228 of the power source 104. In particular, the shutdown threshold voltage 226 may represent a given slump voltage of the power source 104 (e.g. a voltage to which the power source 104 may slump without generally adversely affecting the operation of the device 102, though it is generally preferred to operate the device 102 without a voltage slump) below which the device 102 may shut down. Furthermore, in some examples, the sensing circuit 212 may be correspondingly configured to determine when voltage of the power source 104 reaches such a shutdown threshold voltage 226.

In particular, when a plurality of peripherals 204 of the device 102 are drawing current simultaneously, there is a possibility that all such operational peripherals 204 may draw their respective maximum currents simultaneously, which may cause current output by the power source 104 to reach the maximum current 228, causing the safety circuit 202 to trip and/or which may cause current output by the power source 104 to reach the shutdown threshold voltage 226.

In general, the primary processor 216 may select, as the given maximum current, the smaller of the safety-related maximum current 228 that trips the safety circuit 202 and the voltage slump-related maximum current that causes a voltage slump at terminals of the power source 104 (e.g. as determined periodically using the periodically determined estimated resistance 224 and the preconfigured shutdown threshold voltage 226). Put another way, both of the safety-related maximum current 228 and the voltage slump-related maximum current may cause brownouts, and the like, at the device 102 and the primary processor 216 determines a threshold current from the smaller of the two currents selected as the given maximum current, which is used to prevent the peripherals 204 from drawing the safety-related maximum current 228 that trips the safety circuit 202 and/or the voltage slump-related maximum current from the power source 104, as described hereafter.

However, in some examples, the given maximum current may comprise the selected safety-related maximum current 228 or the voltage slump-related maximum current reduced, for example by 5% or 10% or another factor, for example to prevent the peripherals 204 from drawing the safety-related maximum current 228, reduced by such a factor, and/or the voltage slump-related maximum current from the power source 104, reduced by such a factor. However, such a reduction may be optional.

Hence, in general, the primary processor 216 may further determine the available current overhead in the device 102, which may be determined periodically and/or as the threshold current changes and/or as a presently prioritized peripheral 204 changes.

For example, the primary processor 216 may periodically determine the threshold current and correspondingly determine the given maximum current as described above. However, such determination may also be decoupled, as, for example, the estimated resistance 224 may change at a slower rate than does activity of the peripherals 204.

In particular, while a presently prioritized peripheral 204 may not be drawing the predetermined maximum current, there is a possibility that the presently prioritized peripheral 204 may draw the predetermined maximum current, and a value of the threshold current reflects this situation, while the given maximum current represents either the power source maximum current 228 (e.g. which may not change) or a voltage slump-related maximum current which may change slowly compared to activity of the peripherals 204.

Regardless, the available current overhead in the device 102 may comprise a value of the given maximum current minus the value for the threshold current. In other words, the available current overhead represents an amount of additional current that may be available to operate other peripherals 204 without exceeding the given maximum current, assuming that the presently prioritized peripheral 204 may draw its predetermined maximum current.

As such, a given subset of the peripherals 204 is selected, for example by the secondary processor 218, the given subset of the peripherals 204 comprising a subset of the peripherals 204 that, when operated at their respective maximum currents, might cause the current drawn from the power source 104 to exceed the given maximum current. For example, a sum of their respective maximum currents may exceed the available current overhead. Alternatively, the given subset of the peripherals 204 may be selected by first selecting another subset of the peripherals 204 that, when operated at their respective maximum currents, will not cause the current drawn from the power source 104 to exceed the given maximum current; the remaining peripherals 204 may comprise the given subset of the peripherals 204.

As such, current to the given subset of the peripherals 204 may be throttled via the throttling circuit 210 when the sensed current measured by the sensing circuit 212 reaches the threshold current and the sensing circuit 212 provides an interrupt to the throttling circuit 210. Such throttling of current to the given subset of the peripherals 204 may ensure that the given subset of the peripherals 204 do not draw current and/or their respective maximum currents. In some of these examples, throttling of current of the given subset of the peripherals 204 may comprising turning off the given subset of the peripherals 204 and/or turning off associated power amplifiers 206. In other examples, throttling of current of the given subset of the peripherals 204 may comprise controlling the given subset of the peripherals 204, and/or associated power amplifiers 206, to reduce current usage and/or draw a minimum current. Regardless, the remaining peripherals 204 (e.g. other than given subset of the peripherals 204 and the presently prioritized peripheral 204) may be allowed to operate "normally" and/or not have current throttled thereto, as a sum of their respective maximum currents is within, and/or is less than, the available current overhead.

In some examples, the secondary processor 218 may determine the given subset of the peripherals 204 for which current is to be throttled by determining combinations of the peripherals 204 which, when their respective maximum currents are added together, exceed the available current overhead. Alternatively, such combinations of the peripherals 204 may have been predetermined and stored at the rules 234. Regardless, the secondary processor 218 may provide an indication of the given subset of the peripherals 204 for which current is to be throttled, to the throttling circuit 210.

When an interrupt is received from the sensing circuit 212, for example when a sensed current exceeds the threshold current, the throttling circuit 210 may cause throttling of current to the given subset of the peripherals 204 accordingly.

Put another way, the available current overhead may comprise a difference between the given maximum current and the threshold current. Furthermore, the secondary processor 218 may be further configured to determine the given subset of the peripherals 204 to throttle based on the available current overhead and respective predetermined maximum currents used by the peripherals, other than the presently prioritized peripheral 204.

Furthermore, the sensing circuit 212 may be configured to transmit different types of interrupts, and/or the given subset of the peripherals 204, for which current may be throttled, may depend on a mode of the presently prioritized peripheral 204. For example, when the presently prioritized peripheral 204 comprises a transceiver, a given interrupt provided the sensing circuit 212 may be one of a first given interrupt associated with the transceiver in a transmit mode or a second given interrupt associated with the transceiver in a receive mode; in these examples, the given subset of the peripherals 204 for which throttling of current may occur may be dependent on whether the given interrupt is the first given interrupt or the second given interrupt.

For example, while as depicted the memory 220 stores one respective maximum current for each of the peripherals 204, in other examples the memory 220 may store two maximum currents for each of the peripherals 204 which are transceivers: a transmit maximum current for a transmit mode and a receive maximum current for a receive mode. In other words, a maximum current for a transceiver may differ depending on an operational mode thereof However, in other examples, a transceiver may have one maximum current but the given set of peripherals 204 for which throttling of current may occur may depend on whether a transceiver of the presently prioritized peripheral 204 is in a transmit mode or a receive mode. For example, when a transceiver of the presently prioritized peripheral 204 is in a transmit mode one set of the peripherals 204 may be selected as the given set of peripherals 204 for which throttling of current may occur, while, when a transceiver of the presently prioritized peripheral 204 is in a receive mode, another set of the peripherals 204 may be selected as the given set of peripherals 204 for which throttling of current may occur. For example, when the presently prioritized peripheral 204 is an LTE receiver in a transmit mode, the given set of peripherals 204 may exclude a WiFi transceiver, but when the presently prioritized peripheral 204 is the LTE receiver in a receive mode, the given set of peripherals 204 may include the WiFi transceiver, among other possibilities. Such conditions may be provided in the rules 234.

Hence, in some examples, the primary processor 216 may be further configured to indicate to the sensing circuit 212 to provide the first given interrupt or the second given interrupt to the throttling circuit 210 in response to determining that the sensed current from the power source 104 exceeds the threshold current. For example, when the primary processor 216 selects the presently prioritized peripheral 204 and determines the threshold current, the primary processor 216 may provide an indication of the threshold current to the sensing circuit 212 along with an indication of a type of interrupt to provide to the throttling circuit 210 depending on a mode of the presently prioritized peripheral 204. Furthermore, when the mode of the presently prioritized peripheral 204 changes, the primary processor 216 may again indicate to the sensing circuit 212 a type of associated interrupt to provide to the throttling circuit 210.

Put another way, the primary processor 216 may be further configured to indicate to the sensing circuit 212 to provide the first given interrupt or the second given interrupt to the throttling circuit 210 in response to determining that the sensed current from the power source 104 exceeds the threshold current.

Furthermore, the secondary processor 218 may provide two indications of given subsets of the peripherals 204 which may be throttled to the throttling circuit 210, and/or one for each type of interrupt. Continuing with the example above, when the presently prioritized peripheral 204 comprises a transceiver a first given set of peripherals 204, for which throttling of current may occur, may be selected for the transmit mode, and a second given set of peripherals 204, for which throttling of current may occur, may be selected for the receive mode. The two given sets of peripherals 204 may include different or similar peripherals 204. Indications of both given sets of the peripherals 204 may be provided to the throttling circuit 210 which may cause throttling to one of the two given sets of peripherals 204 depending on a type of interrupt received from the sensing circuit 212.

It is understood that the device 102 may include any other suitable components including, but not limited to, a display screen, a location positioning device (e.g. a Global Positioning System device) and the like.

Operation of the device 102 is next described with respect to FIG. 3, FIG. 4, FIG. 5, FIG. 6 and FIG. 7, which are substantially similar to FIG. 2, with like components having like numbers.

Figure 3:
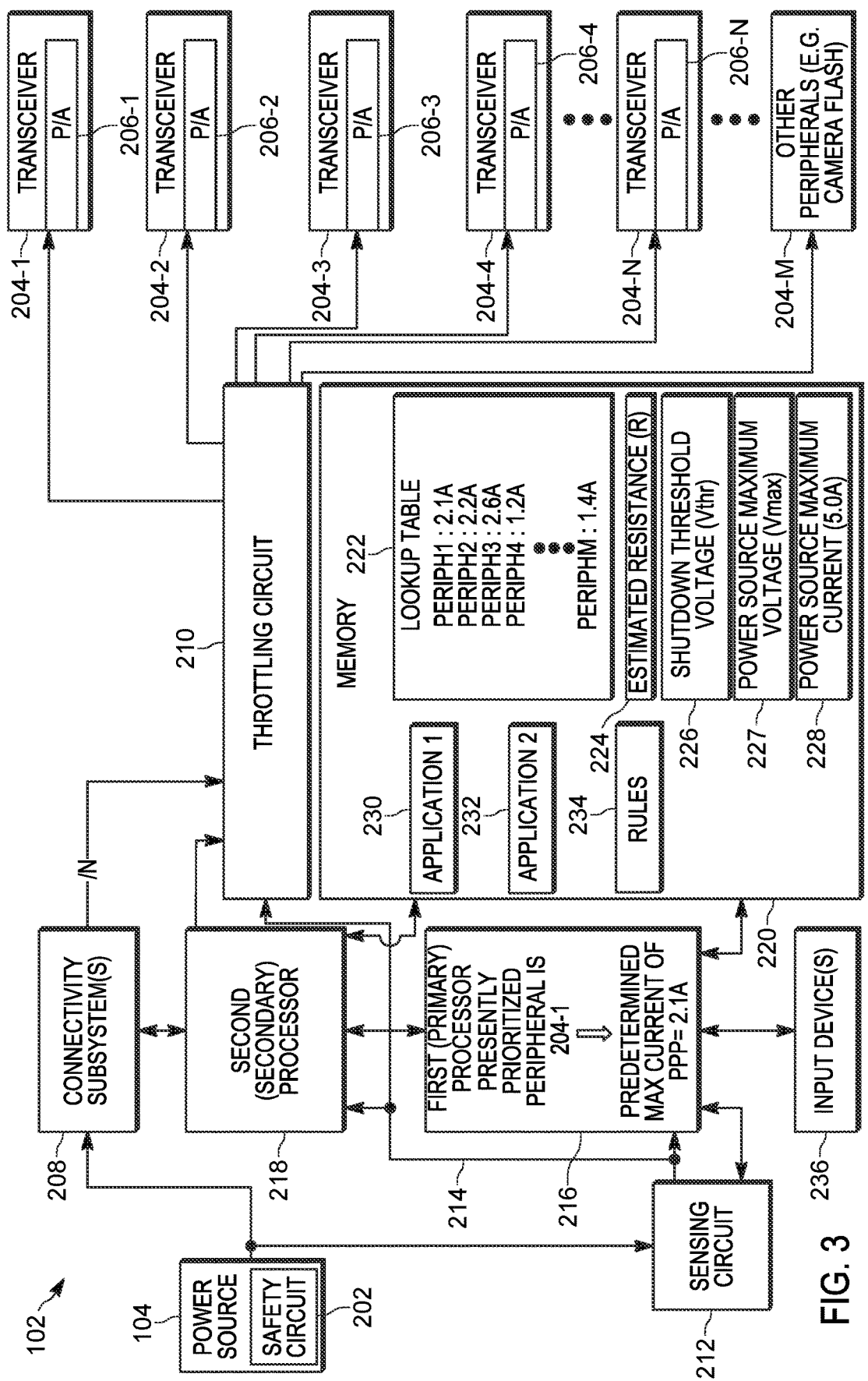
FIG. 3 shows the device of FIG. 1 determining a presently prioritized peripheral and a maximum current thereof, in accordance with some examples.

Attention is first directed to FIG. 3 which depicts the primary processor 216 determining that the peripheral 204-1 is a presently prioritized peripheral 204-1, as describe above; for example, the transceiver of the presently prioritized peripheral 204-1 may be transmitting or receiving video and the other peripherals 204 may not be in use (e.g. other than the other transceivers transmitting or receiving metadata). As such, the primary processor 216, determines that a predetermined maximum current of the presently prioritized peripheral 204-1 is 2.1 A, as retrieved from the lookup table 222 (e.g. the maximum current of "Periph1").

Figure 4:
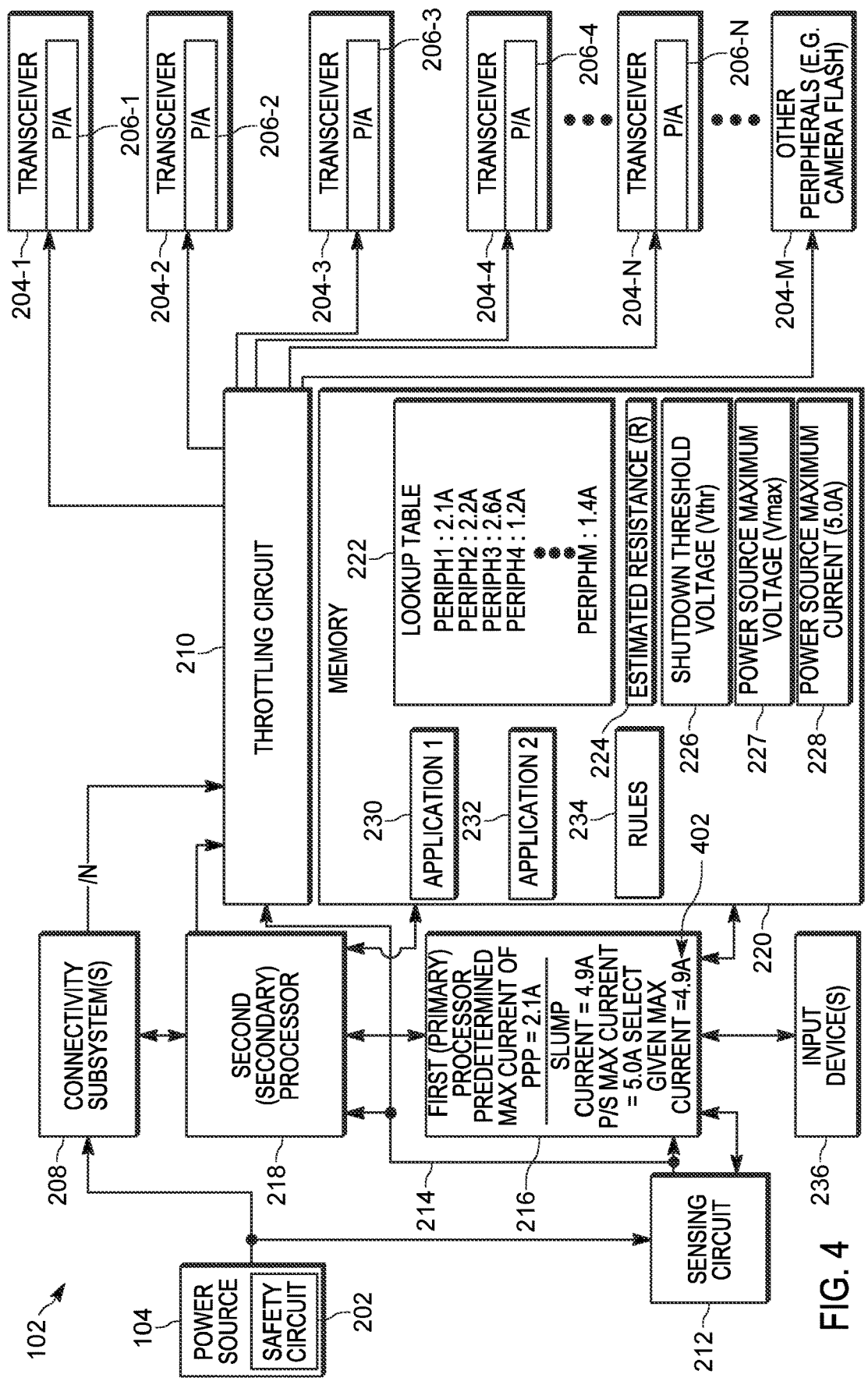
FIG. 4 shows the device of FIG. 1 determining a given maximum current of a power source thereof, in accordance with some examples.

Attention is next directed to FIG. 4 which depicts the primary processor 216 determining a voltage slump-related maximum current (e.g. a "Slump Current") of 4.9 A, as described above, and furthermore determining a safety-related maximum current ("P/S Max Current") of 5.0 A retrieved from the memory 220 (e.g. the power source maximum current 228). As such, the primary processor 216 selects the smaller of the voltage slump-related maximum current and the safety-related maximum current as a given maximum current 402 (e.g. 4.9 A of the slump-related maximum current is selected).

Figure 5:
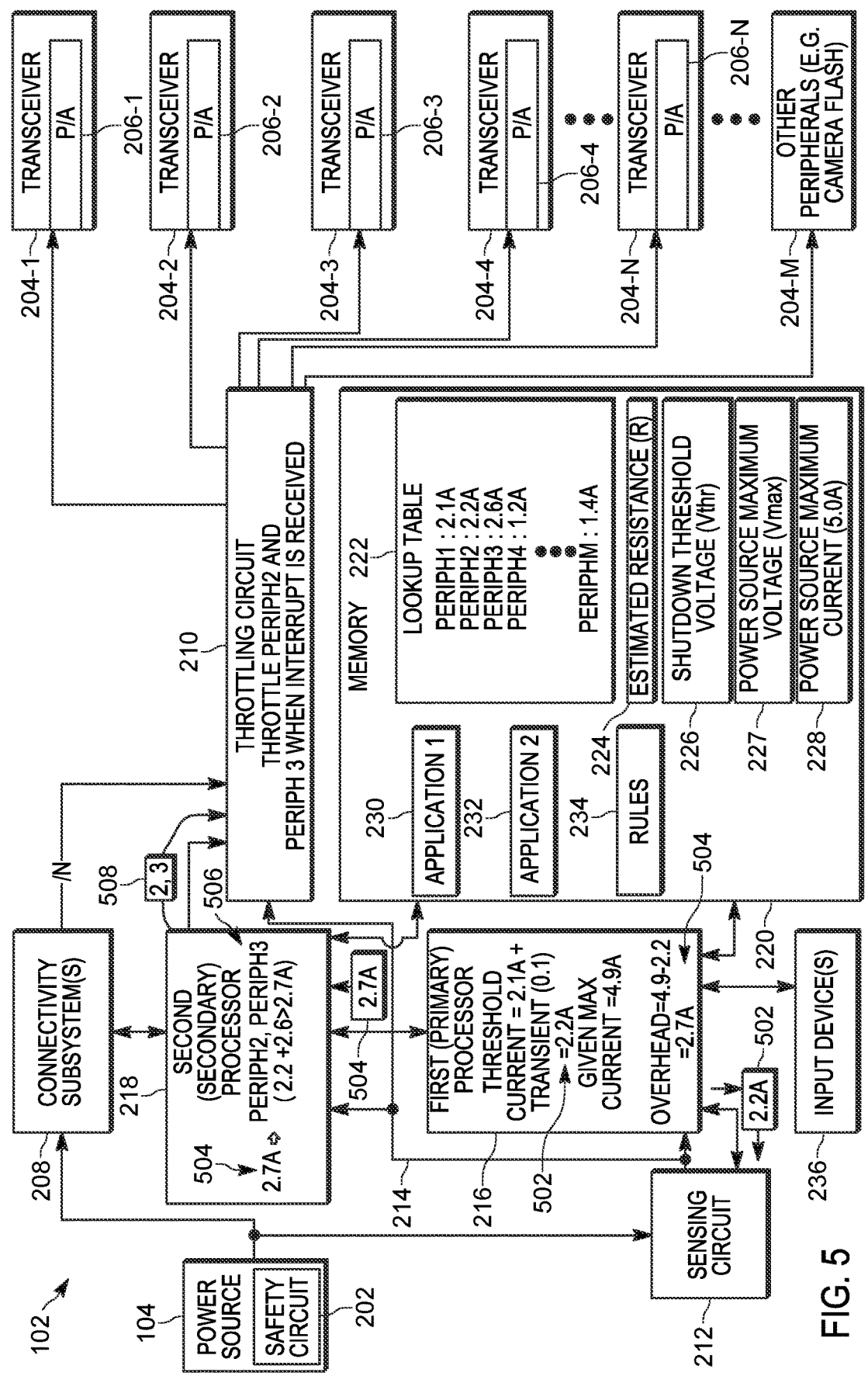
FIG. 5 shows the device of FIG. 1 determining an available current overhead and a given subset of the peripherals to which current may be throttled, in accordance with some examples.

Attention is next directed to FIG. 5 which depicts the primary processor 216 determining a threshold current 502 of 2.2 A by adding a predetermined transient current (e.g. of 0.1 A) to the predetermined maximum current of 2.1 A of the presently prioritized peripheral 204-1. The primary processor 216 further determines an available current overhead 504 of 2.7 A by subtracting the threshold current 502 from the given maximum current 402 (e.g. 4.9 A−2.2 A=2.7 A).

The primary processor 216 provides the threshold current 502 to the sensing circuit 212 and further provides the available current overhead 504 to the secondary processor 218.

As also depicted in FIG. 5, the secondary processor 218 determines a given subset 506 of the peripherals 204 for which throttling of current may occur by comparing the available current overhead 504 with sums of maximum currents of the peripherals 204, such maximum currents retrieved being from the lookup table 222. For example, as depicted, the secondary processor 218 determines that a sum of maximum currents of the peripherals 204-2, 204-3 is greater than the available current overhead 504. As depicted, the maximum currents 2.2 A and 2.6 A of the peripherals 204-2, 204-3 sum to 2.8 A which is greater than the 2.7 A of the available current overhead 504. The maximum currents 1.2 A and 1.4 A of the remaining peripherals 204-4 and 204-M sum to 2.6 A which is less than the 2.7 A of the available current overhead 504.

As such, the secondary processor 218 selects the peripherals 204-2, 204-3 as the given subset 506 of the peripherals 204 for which throttling of current may occur and provides an indication 508 of the given subset 506 (e.g. as depicted, "2" and "3" respectively indicating peripherals 204-2, 204-3) to the throttling circuit 210 which prepares to throttle the peripherals 204-2, 204-3 of the given subset 506 when an interrupt is received. For example, a circuit of the throttling circuit 210 may prepare to control ultra-fast switches to turn off power to the peripherals 204-2, 204-3 (e.g. and/or power amplifiers 206-2, 206-3 thereof) in response to receiving an interrupt on the hardware data line 214. Such preparation may include controlling a plurality of other switches to states where the ultra-fast switches on the power lines to the peripherals 204-2, 204-3 are controlled to turn power off to the peripherals 204-2, 204-3, in response to receiving an interrupt on the hardware data line 214, and the like. In a particular example, ultra-fast switches on the power lines to the peripherals 204-2, 204-3 may include FETs with gates that may be open or closed, and the indication 508 may close switches between the hardware data line 214 and gates of FETs of ultra-fast switches on the power lines to the peripherals 204-2, 204-3, which are normally closed, so that an interrupt on the hardware data line 214 may cause such gates to open, disconnecting power between the connectivity subsystem 208 and the peripherals 204-2, 204-3 (e.g. with gates of FETs of ultra-fast switches on the power lines to the other peripherals 204 remaining closed, and corresponding switches between the hardware data line 214 and gates of such FETs remaining open). However, the throttling circuit 210 may cause power to the peripherals 204-2, 204-3 to be turned off in any suitable manner and/or cause current at the peripherals 204-2, 204-3 to be throttled in any suitable manner.

Figure 6:
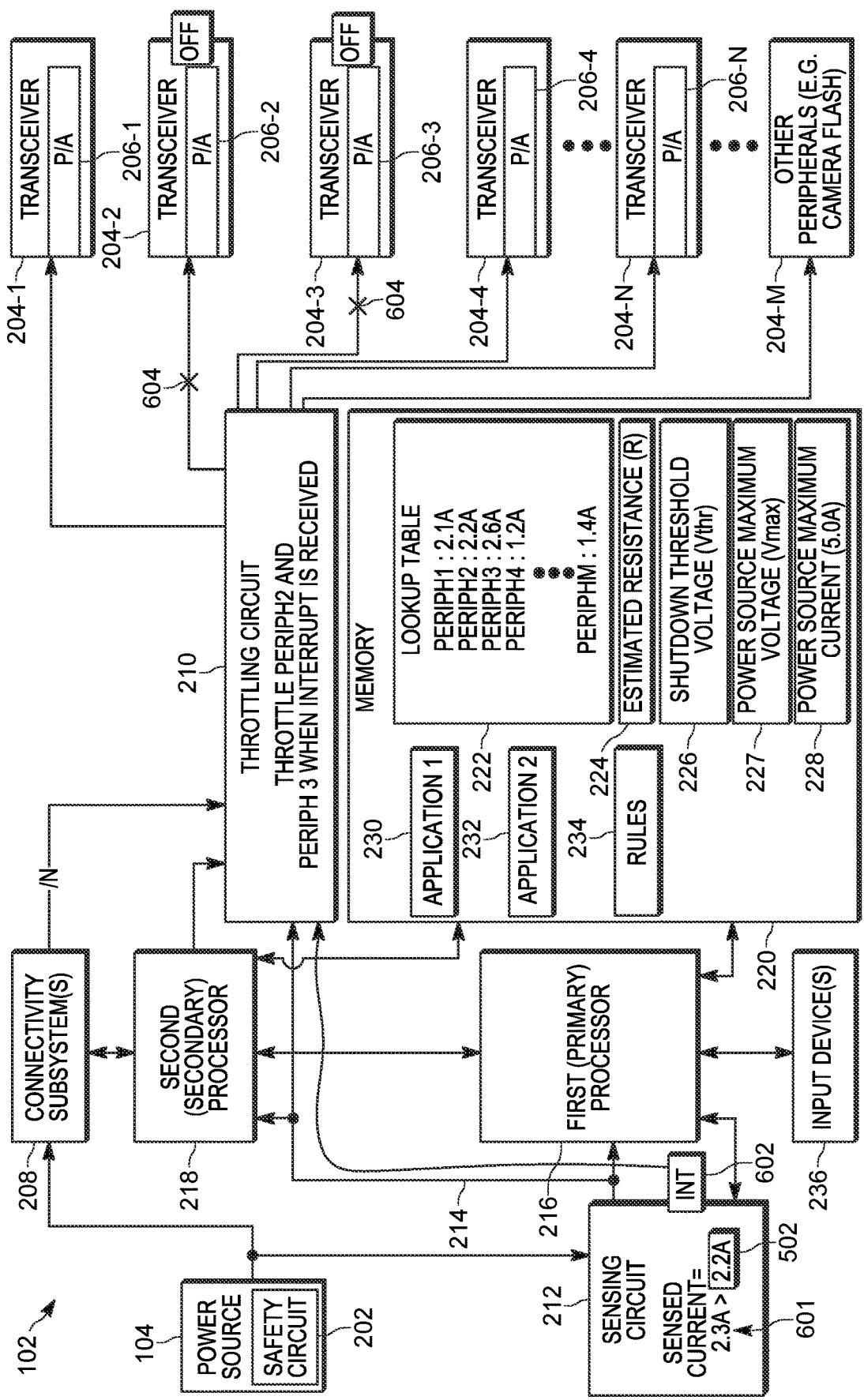
FIG. 6 shows the device of FIG. 1 throttling current to the given subset of the peripherals in response to a sensed current from the power source exceeds the threshold current, in accordance with some examples.

Attention is next directed to FIG. 6 which depicts the sensing circuit 212 determining that a sensed current 601 (e.g. of 2.3 A) is greater than the threshold current 502. In response, the sensing circuit 212 provides an interrupt 602 on the hardware data line 214 to the throttling circuit 210. The throttling circuit 210 responds to the interrupt 602 by turning off power to the power amplifiers 206-2, 206-3 of the peripherals 204-2, 204-3, represented by indications 604 (e.g. "X") indicating power is off on a power line to the peripherals 204-2, 204-3. Hence, the peripherals 204-2, 204-3 are turned "OFF" and current of the peripherals 204-2, 204-3 is throttled. However, the other peripherals 204 remain on.

However, other examples of throttling current at the peripherals 204-2, 204-3 are within the scope of the present specification including, but not limited to, throttling maximum current of the peripherals 204-2, 204-3 of the given subset 506, in combination with the unthrottled current of the other peripherals 204, such that a sum of the maximum currents of the unthrottled peripherals 204, and the throttled maximum current of the peripherals 204-2, 204-3 of the given subset 506, does not exceed the available current overhead 504. Similarly, throttling current at the peripherals 204-2, 204-3 may include the throttling circuit 210 transmitting data commands to the peripherals 204-2, 204-3 to cause the peripherals 204-2, 204-3 to reduce current usage.

Figure 7:
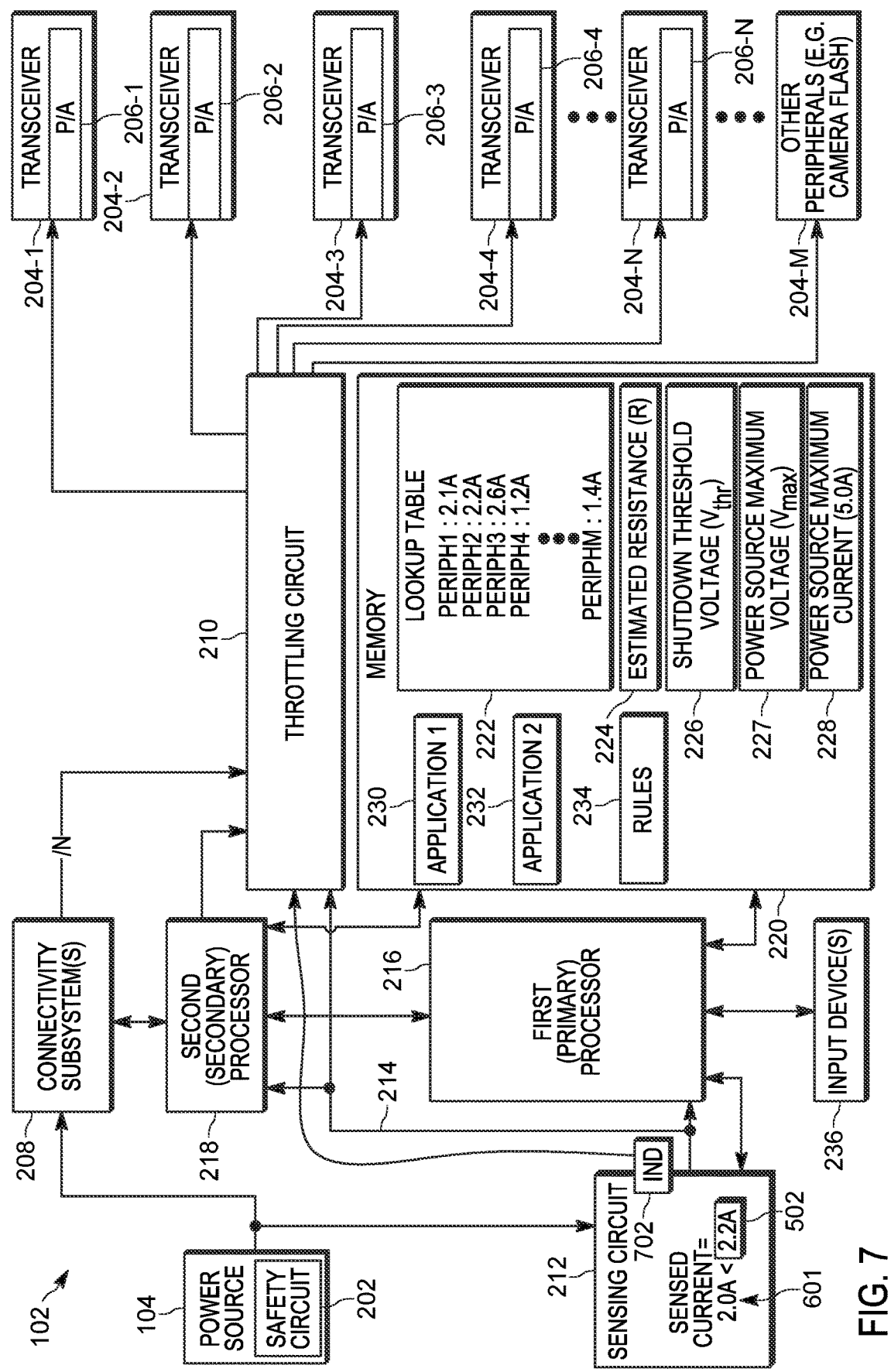
FIG. 7 shows the device of FIG. 1 stopping throttling current to the given subset of the peripherals in response to a sensed current from the power source no longer exceeding the threshold current, in accordance with some examples.

Attention is next directed to FIG. 7 which depicts the sensing circuit 212 determining that the sensed current 601 (e.g. of 2.0 A) has now dropped to less than the threshold current 502 and, in response, provides an indication 702 of same on the hardware data line 214 to the throttling circuit 210. The throttling circuit 210 responds to indication 702 by turning power back on to the power amplifiers 206-2, 206-3 of the peripherals 204-2, 204-3, which turn on power to the peripherals 204-2, 204-3 accordingly and hence stops throttling of current at the peripherals 204-2, 204-3.

Hence, the sensing circuit 212 is further configured to: in response to determining that the sensed current 601 at the power source 104 has fallen back below the threshold current 502, provide a given indication to the throttling circuit 210 to cause the throttling circuit 210 to stop throttling the respective currents to the given subset of the peripherals 204.

In some examples, the interrupt 602 may comprise a "high" voltage and/or signal on the hardware data line 214 (e.g. which opens gates of FETs of ultra-fast switches on the data lines to the peripherals 204-2, 204-3), and which is turned off in response to determining that the sensed current 601 at the power source 104 has fallen back below the threshold current 502. Hence, for example, the indication 702 may comprise the interrupt 602 being turned off.

Hence, the interrupt 602 may be understood to include a voltage on the hardware data line 214 that may cause switches in the throttling circuit 210 to the power amplifiers 206-2, 206-3, to open (or close) and/or otherwise indicate to the power amplifiers 206-2, 206-3 that current thereto is to be throttled.

Furthermore, the interrupt 602 may be received at the processors 216, 218 to indicate to the processors 216, 218 that the peripherals 204-2, 204-3 (and/or the given subset 506 of the peripherals 204) are being throttled with respect to current and may not be available for usage. In some of these examples, one or more of the processors 216, 218 may provide an indication of same at a notification device of the device 102, such as at a display screen thereof to notify a user of the device 102 that the peripherals 204-2, 204-3 may be temporarily unavailable for use. Similarly, when current to the peripherals 204-2, 204-3 is unthrottled, one or more of the processors 216, 218 may also provide an indication of same at a notification device. However, the interrupt 602 received at the processors 216, 218 may have other effects, including, for example, preventing the processor 218 and/or the at least one connectivity subsystem 208 from attempting to use the peripherals 204-2, 204-3 to transmit associated metadata, and the like.

Other examples are within the scope of the present specification. For example, the sensing circuit 212 may provide the interrupt 602 only when the sensed current 601 is greater than the threshold current 502 for a given time period, which may be on the order of a few microseconds, and the like.

Figure 8:
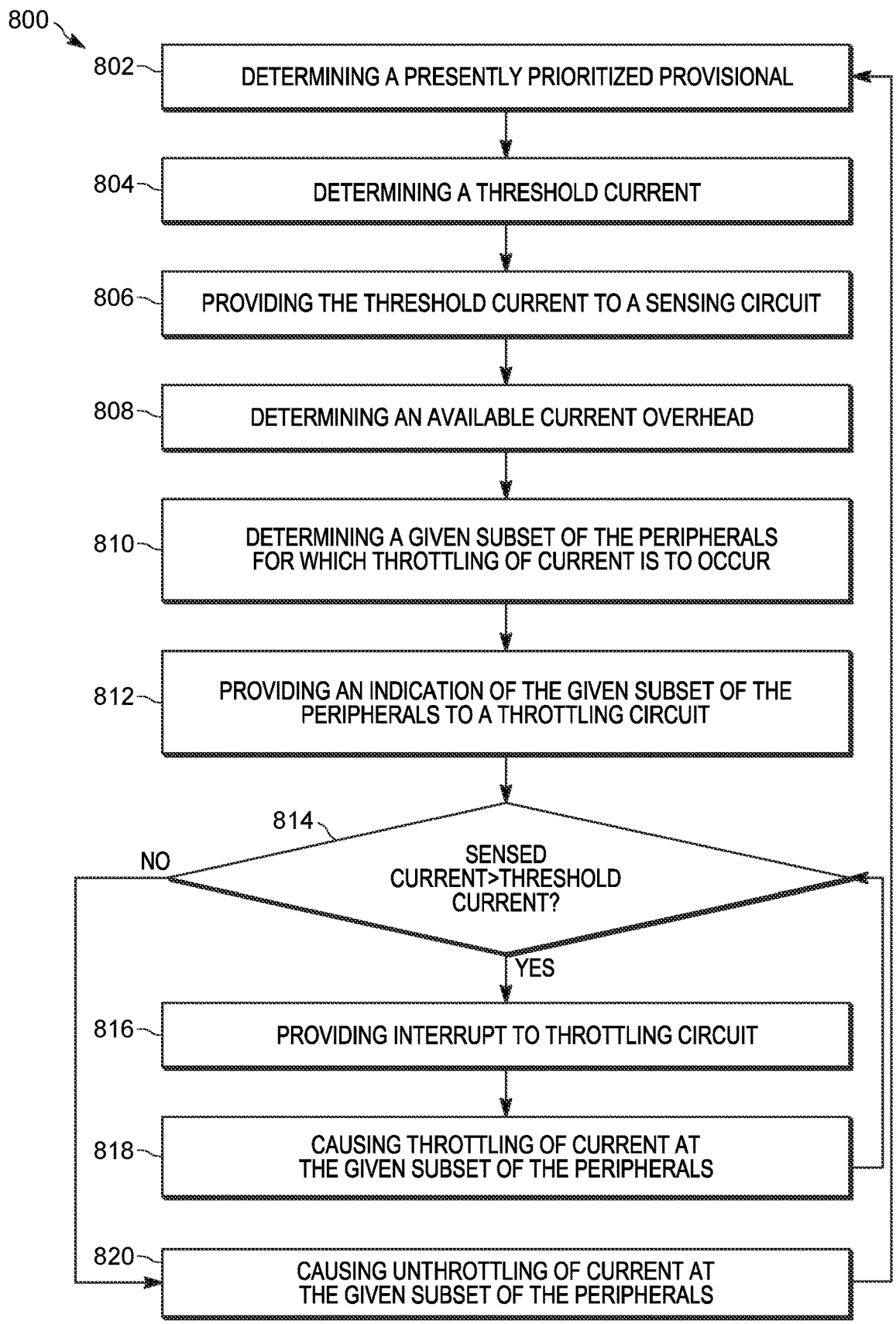
FIG. 8 is a flowchart of a process for throttling current to peripherals, in accordance with some examples.

Attention is now directed to FIG. 8 which depicts a flowchart representative of a process 800 for throttling current and/or power to peripherals. The operations of the process 800 of FIG. 8 may correspond at least in part, to machine readable instructions that are executed by the device 102, and specifically the processors 216, 218 of the device 102 implementing the respective applications 230, 232. However, some operations of the process 800 of FIG. 8 may correspond to hardware configurations of the circuits 210, 212. The process 800 is one way in which the device 102 may be configured.

The process 800 of FIG. 8 need not be performed in the exact sequence as shown and likewise various blocks may be performed in parallel rather than in sequence. Accordingly, the components of process 800 are referred to herein as "blocks" rather than "steps. The process 800 of FIG. 8 may be implemented on variations of the device 102, as well. For example, while the process 800 is described with respect to specific processors 216, 218 performing certain blocks, such blocks may be understood to be performed by one or more of the processors 216, 218.

At a block 802, the device 102, for example the primary processor 216, determines a presently prioritized peripheral 204 for example as described with respect to FIG. 4.

At a block 804, the device 102, for example the primary processor 216, determines a threshold current, for example as described with respect to FIG. 5. For example, as has already been described, the threshold current may comprise one or more of: a predetermined maximum current of the presently prioritized peripheral 204; and the predetermined maximum current of the presently prioritized peripheral 204 adjusted by a given amount.

At a block 806, the device 102, for example the primary processor 216, provides the threshold current (e.g. an indication of a value thereof) to the sensing circuit 212, for example as described with respect to FIG. 5. In particular, as has already been described, the sensing circuit 212 is configured to sense when a sensed current of the power source 104 of the device 102 exceeds a threshold current.

At a block 808, the device 102, for example the primary processor 216, determines an available current overhead, for example as described with respect to FIG. 5.

At a block 810, the device 102, for example the secondary processor 218, determines a given subset of the peripherals 204 for which throttling of current is to occur based, for example on the available current overhead, as described with respect to FIG. 5. For example, as has already been described, the available current overhead may comprises a difference between the threshold current and a given maximum current, such that the process 800 may further comprise determining the given subset of the peripherals 204 to throttle based on the available current overhead and respective predetermined maximum currents (e.g. as stored at the memory 220) used by the peripherals 204, other than the presently prioritized peripheral 204-1. Similarly, the given maximum current may comprise a smaller of a safety-related maximum current (e.g. the current 228) that trips the safety circuit 202; and a voltage slump-related maximum current that causes a voltage slump at terminals of the power source 104.

At a block 812, the device 102, for example the secondary processor 218, provides an indication of the given subset of the peripherals 204, for which throttling of current is to occur, to the throttling circuit 210, as described with respect to FIG. 5.

While the blocks 802, 804, 806, 808, 810 and 812 may be implemented at least partially via software implemented by one or more of the processors 216, 218, the following blocks of the process 800 are understood to be implemented in hardware of the circuits 210, 212 and, in particular, ultra-fast switching components.

At a block 814, the device 102, and specifically the sensing circuit 212, determines whether a sensed current exceed the threshold current. In response to the sensing circuit 212 determining that the sensed current exceeds the threshold current (e.g. a "YES" decision at the block 814), at a block 816, the device 102, and specifically the sensing circuit 212, provides the interrupt 602 to the throttling circuit 210 via the hardware data line 214 therebetween; which, at a block 818 causes throttling of current to the given subset of the peripherals 204 (e.g. based on the indication 508 of the given subset 506), as described above with respect to FIG. 6.

For example, as has already been described, the presently prioritized peripheral 204-1 may comprise a transceiver, and the given interrupt may be one of a first given interrupt associated with the transceiver in a transmit mode or a second given interrupt associated with the transceiver in a receive mode, and the given subset of the peripherals 204 which for which current is throttled may be dependent on whether the given interrupt is the first given interrupt or the second given interrupt. Furthermore, the process 800 may further comprise indicating, at the device 102, for example from the first processor 216, to the sensing circuit 21, to provide the first given interrupt or the second given interrupt to the throttling circuit 210 in response to determining that the sensed current from the power source 104 exceeds the threshold current.

Furthermore, as has already been described, at least a portion of the peripherals 204 may comprise transceivers, and the throttling circuit 210 causing throttling of the respective currents to the given subset 506 of the peripherals 204 may comprise the throttling circuit 210 causing throttling of the respective currents to power amplifiers 206 of the transceivers. Similarly, determining (e.g. at the block 802) which of the peripherals is the presently prioritized peripheral 204-1 may comprises communicating with the at least one connectivity subsystem 208 of the device 102 over one or more of the data lines, the at least one connectivity subsystem 208 including hardware for the transceivers, and at least a portion of the peripherals 204 may comprise the transceivers.

Returning to the block 814, the device 102, and specifically the sensing circuit 212, continues to determine whether the sensed current exceed the threshold current and, in response to the sensing circuit 212 determining that the sensed current from the power source 104 has fallen back below the threshold current(e.g. a "NO" decision at the block 814), at a block 820, the device 102, and specifically the sensing circuit 212, provides, from the sensing circuit 212 to the throttling circuit 210, on the hardware data line 214, therebetween, the given indication 702 which, at a block 820 causes throttling of current to the given subset of the peripherals 204 to stop, as described above with respect to FIG. 7.

Furthermore the process 800 may be repeated after the block 820 and/or as the presently prioritized peripheral 204 changes, for example as peripherals 204 are used, or not, at the device 102, and/or as the associated threshold current and available current overhead changes, with suitable blocks of the process 800 being reimplemented accordingly.

As has previously been mentioned, in some examples, the sensing circuit 212 may be correspondingly configured to determine when voltage of the power source 104 reaches such a shutdown threshold voltage 226 (e.g. which, in some examples, may occur prior to a sensed current from the power source exceeding the threshold current. In these examples, the sensing circuit 212 may provide the given interrupt to the throttling circuit 210 via the hardware data line 214 therebetween. Hence, in such examples, the voltage of the power source 104 reaching (e.g. falling below) such a shutdown threshold voltage 226 (or, rising back above such a shutdown threshold voltage 226) may be another condition under which the device 102 implements the blocks 816, 818, 820), presuming that the processors 216, 218 have previously determined peripherals 205 for which to throttle current, etc., at the blocks 802 to 812.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, to sense current, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   peripherals powered by a power source;
   a throttling circuit configured to: in response to receiving a given interrupt, cause throttling of respective currents to a given subset of the peripherals;
   a sensing circuit configured to: in response to determining that a sensed current from the power source exceeds a threshold current, provide the given interrupt to the throttling circuit via a hardware data line therebetween;
   a primary processor configured to: determine the threshold current based at least on a predetermined maximum current of a presently prioritized peripheral; and provide the threshold current to the sensing circuit; and
   a secondary processor configured to: determine the given subset of the peripherals based on an available current overhead.

2. The device of claim 1, wherein the threshold current comprises one or more of: the predetermined maximum current of the presently prioritized peripheral; and the predetermined maximum current of the presently prioritized peripheral adjusted by a given amount.

3. The device of claim 1, wherein the available current overhead comprises a difference between the threshold current and a given maximum current, and the secondary processor is further configured to determine the given subset of the peripherals based on the available current overhead and respective predetermined maximum currents used by the peripherals, other than the presently prioritized peripheral.

4. The device of claim 3, wherein the power source includes a safety circuit, and the given maximum current comprises a smaller of a safety-related maximum current that trips the safety circuit; and a voltage slump-related maximum current that causes a voltage slump at terminals of the power source.

5. The device of claim 1, wherein the presently prioritized peripheral comprises a transceiver, and the given interrupt is one of a first given interrupt associated with the transceiver in a transmit mode or a second given interrupt associated with the transceiver in a receive mode, and the given subset of the peripherals is dependent on whether the given interrupt is the first given interrupt or the second given interrupt.

6. The device of claim 5, wherein the primary processor is further configured to indicate to the sensing circuit to provide the first given interrupt or the second given interrupt to the throttling circuit in response to determining that the sensed current from the power source exceeds the threshold current.

7. The device of claim 1, wherein the sensing circuit is further configured to: in response to determining that the sensed current from the power source has fallen back below the threshold current, provide a given indication to the throttling circuit to cause the throttling circuit to stop throttling the respective currents to the given subset of the peripherals.

8. The device of claim 1, wherein at least a portion of the peripherals comprise transceivers, and the throttling circuit is further configured to cause throttling of the respective currents to the given subset of the peripherals by causing throttling of the respective currents to power amplifiers of the transceivers.

9. The device of claim 1, wherein at least a portion of the peripherals comprise transceivers and the device further comprises at least one connectivity subsystem including hardware for the transceivers, the at least one connectivity subsystem in communication with the secondary processor and the primary processor via one or more data lines, and wherein the primary processor is further configured to determine which of the peripherals is the presently prioritized peripheral by communicating with the at least one connectivity subsystem over one or more of the data lines and the secondary processor.

10. The device of claim 1, wherein the throttling circuit comprises respective hardware switches to cause throttling of the respective currents to the given subset of the peripherals.

11. The device of claim 1, wherein the sensing circuit and the throttling circuit comprise respective ultra-fast switching components.

12. A method comprising:
determining, at one or more processors of a device, a presently prioritized peripheral of the device;
determining, at the one or more processors, a threshold current of the device;
providing, via the one or more processors, the threshold current to a sensing circuit of the device, the sensing circuit configured to sense when a sensed current of a power source of the device exceeds the threshold current;
determining, at the one or more processors, an available current overhead of the device;
determining, at the one or more processors, based on the available current overhead, a given subset of peripherals of the device to current throttle when the sensed current exceeds the threshold current;
providing, at the one or more processors, an indication of the given subset of peripherals to a throttling circuit;
in response to the sensing circuit sensing that the sensed current of the power source exceeds the threshold current, providing a given interrupt from the sensing circuit to the throttling circuit, via a hardware data line therebetween; and
in response to the throttling circuit receiving the given interrupt on the hardware data line, causing throttling, via the throttling circuit, based on the indication of the given subset, throttling of current at the given subset of the peripherals.

13. The method of claim 12, wherein the threshold current comprises one or more of: a predetermined maximum current of the presently prioritized peripheral; and the predetermined maximum current of the presently prioritized peripheral adjusted by a given amount.

14. The method of claim 12, wherein the available current overhead comprises a difference between the threshold current and a given maximum current, and the method further comprises determining the given subset of the peripherals to throttle based on the available current overhead and respective predetermined maximum currents used by the peripherals, other than the presently prioritized peripheral.

15. The method of claim 14, wherein the power source includes a safety circuit, and the given maximum current comprises a smaller of a safety-related maximum current that trips the safety circuit; and a voltage slump-related maximum current that causes a voltage slump at terminals of the power source.

16. The method of claim 12, wherein the presently prioritized peripheral comprises a transceiver, and the given interrupt is one of a first given interrupt associated with the transceiver in a transmit mode or a second given interrupt associated with the transceiver in a receive mode, and the given subset of the peripherals is dependent on whether the given interrupt is the first given interrupt or the second given interrupt.

17. The method of claim 16, further comprising, indicating, from the one or more processors, to the sensing circuit to provide the first given interrupt or the second given interrupt to the throttling circuit in response to determining that the sensed current from the power source exceeds the threshold current.

18. The method of claim 12, further comprising: in response to the sensing circuit determining that the sensed current from the power source has fallen back below the threshold current, providing, from the sensing circuit to the throttling circuit on the data line therebetween, a given indication to cause the throttling circuit to stop throttling the respective currents to the given subset of the peripherals.

19. The method of claim 12, wherein at least a portion of the peripherals comprise transceivers, the throttling circuit causing throttling of the respective currents to the given subset of the peripherals comprises the throttling circuit causing throttling of the respective currents to power amplifiers of the transceivers.

20. The method of claim 12, wherein determining which of the peripherals is the presently prioritized peripheral comprises the one or more processors communicating with at least one connectivity subsystem of the device over one or more of the data lines, the at least one connectivity subsystem including hardware for transceivers, wherein at least a portion of the peripherals comprise the transceivers.

* * * * *